United States Patent
Gerard et al.

(10) Patent No.: US 7,935,769 B2
(45) Date of Patent: May 3, 2011

(54) METHOD FOR PREPARING A LIVING POLYMER COMPRISING METHACRYLIC AND/OR METHACRYLATE UNITS

(75) Inventors: Pierre Gerard, Denguin (FR);
Stephanie Magnet, Morlanne (FR);
Olivier Guerret, La Tour de Salvagny (FR); Bernadette Charleux, Vincennes (FR); Julien Nicolas, La Garenne Colombes (FR)

(73) Assignee: Arkema France, Colombes (FR)

( * ) Notice: Subject to any disclaimer, the term of this patent is extended or adjusted under 35 U.S.C. 154(b) by 497 days.

(21) Appl. No.: 12/094,301

(22) PCT Filed: Nov. 20, 2006

(86) PCT No.: PCT/FR2006/051201
§ 371 (c)(1),
(2), (4) Date: May 20, 2008

(87) PCT Pub. No.: WO2007/057620
PCT Pub. Date: May 24, 2007

(65) Prior Publication Data
US 2008/0306169 A1 Dec. 11, 2008

(30) Foreign Application Priority Data

Nov. 21, 2005 (FR) ..................... 05 11780

(51) Int. Cl.
*C08F 2/00* (2006.01)
*C08F 20/10* (2006.01)
*C08F 12/02* (2006.01)
*A61K 47/32* (2006.01)

(52) U.S. Cl. ...... 526/215; 526/346; 526/318; 514/772.6

(58) Field of Classification Search .............. 514/772.6; 526/215, 346, 318
See application file for complete search history.

(56) References Cited

U.S. PATENT DOCUMENTS

| 7,199,214 B2 | 4/2007 | Couturier et al. |
| 2006/0058467 A1 | 3/2006 | Guerret |
| 2006/0142511 A1* | 6/2006 | Couturier et al. ............. 526/217 |
| 2007/0082827 A1 | 4/2007 | Schmidt et al. |

FOREIGN PATENT DOCUMENTS

EP  1 464 648 A1 * 10/2004

OTHER PUBLICATIONS

Charleux et al., "Theoretical Ex0ression of the Average Activation-Deactivation Equilibrmm Constant in Controlled/Living Free-Radical Copolymerization . . . ", Macromolecules, 2005, vol. 38, p. 5485-5492. Published Jun. 1, 2005.*
Charleux, B., et al., "Theoretical Expression of the Average Activation-Deactivation Equilibrium Constant in Controlled/Living Free-Radical Copolymerization . . . ", Macromolecules, 2005,38-5485-5492.

* cited by examiner

*Primary Examiner* — William K Cheung
(74) *Attorney, Agent, or Firm* — Steven D. Boyd

(57) ABSTRACT

The invention relates to a method for preparing a living polymer comprising methacrylic and/or methacrylate units using a monofunctional or polyfunctional alkoxyamine consisting in polymerising one or several types of methacrylic an/or methacrylate units.

14 Claims, No Drawings

METHOD FOR PREPARING A LIVING POLYMER COMPRISING METHACRYLIC AND/OR METHACRYLATE UNITS

TECHNICAL FIELD

The present invention relates to a method for preparing a living polymer comprising methacrylic and/or methacrylate units.

The present invention also relates to a method for preparing a multiblock copolymer in which the block(s) comprising methacrylic and/or methacrylate units exhibit(s) a living nature.

The general field of the invention is therefore that of living controlled radical polymerization.

Controlled radical polymerization makes it possible to reduce the deactivation reactions of the growing radical species, in particular the termination step, which reactions, in conventional radical polymerization, interrupt the growth of the polymer chain irreversibly and without control.

In order to decrease the probability of the termination reactions, it has been proposed to transiently and reversibly block the growing radical species, by forming active species known as "dormant species" in the form of a bond having a low dissociation energy. This thus makes it possible to obtain polymer chains exhibiting a controlled number-average (or weight-average) molecular mass and a lower polydispersity index than in conventional radical polymerization. This also makes it possible to synthesize block copolymers by starting the synthesis of a block on the dormant species.

Methods for obtaining living polymers based on acrylate units or multiblock copolymers comprising at least one block of acrylate units exhibiting a living nature are known in the prior art.

Thus, EP 1256138 describes the preparation of a B-A-B triblock polymer, in which A represents a poly(n-butyl acrylate) block and B represents poly(methyl methacrylate) blocks, which method comprises the following successive steps:
- a step of preparing the living difunctional block A by polymerization of n-butyl acrylate in the presence of a difunctional alkoxyamine performing the role of initiator and of control agent;
- a step of adding methyl methacrylate to the reaction medium comprising the synthesized A block, the polymerization being reinitiated at the two ends of the A block due to the living nature of this block.

The method described in this document has the following drawbacks:
- the degree of conversion of the methyl methacrylate in the B blocks is insufficient, insofar as it does not exceed 50%;
- the B-A-B block copolymer obtained has a polydispersity index of the order of 2, this value being too high and reflecting a certain nonhomogeneity in terms of lengths of polymer chains constituting the mixture obtained;
- it is not possible to reinitiate the synthesis of subsequent blocks from the B blocks, since the B blocks do not exhibit a living nature, thereby considerably limiting the number of polymer architectures that can be envisioned with this method.

The inventors have fixed themselves the objective of developing a method for obtaining a living polymer comprising methacrylic and/or methacrylate units allowing reinitiation of at least one of its ends and which makes it possible:
- when the living polymer based on methacrylic and/or methacrylate units is synthesized by reinitiation of the polymerization from a block of different nature, to obtain a degree of conversion of the methacrylic and/or methacrylate monomers making up the polymer of abut 90%, within a reasonable period of about a few hours of polymerization;
- to obtain block copolymers comprising one or more living blocks based on methacrylic and/or methacrylate units having a polydispersity index of less than 2.

The authors have discovered, surprisingly, that by adding styrene monomers to the reaction mixture during the synthesis of the block comprising methacrylic and/or methacrylate units, it is possible to confer a living nature on the resulting block.

DETAILED DESCRIPTION OF THE INVENTION

Thus, according to a first subject, the invention relates to a method for preparing a living polymer comprising methacrylic and/or methacrylate units derived from the polymerization of one or more methacrylic and/or methacrylate monomers using:
at least one monofunctional alkoxyamine of formula (I) below:

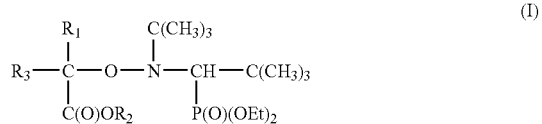

in which:
$R_1$ and $R_3$, which may be identical or different, represent a linear or branched alkyl group containing a number of carbon atoms ranging from 1 to 3;
$R_2$ representing a hydrogen atom, a linear or branched alkyl group containing a number of carbon atoms ranging from 1 to 8, a phenyl group, an alkali metal such as Li, Na or K, or an ammonium ion such as $NH_4^+$ or $NHBu_3^+$; preferably, $R_1$ being $CH_3$ and $R_2$ being H; and/or
at least one polyfunctional alkoxyamine of formula (III):

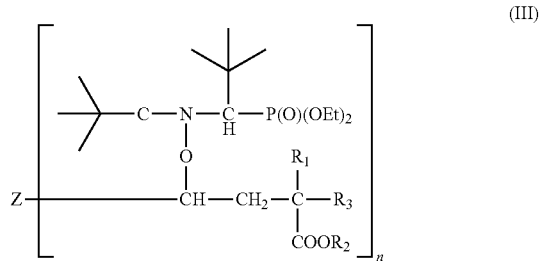

in which:
$R_1$, $R_2$ and $R_3$ are as defined above;
Z represents an aryl group or a group of formula $Z_1$—[X—C(O)]$_n$, in which $Z_1$ represents a polyfunctional structure originating, for example, from a compound of the polyol type, X is an oxygen atom, a nitrogen atom bearing a carbonaceous group or a hydrogen atom, or a sulfur atom; and
n is an integer greater than or equal to 2; said method for preparing the living polymer comprising a step of polymerizing the methacrylic and/or methacrylate monomer(s) in the presence of at least one styrene monomer.

It is specified that the symbol Et in the formulae above corresponds to the ethyl group.

In general, the styrene monomer(s) is (are) present at a content ranging from 2 to 90 mol % relative to the number of moles of methacrylic and/or methacrylate monomers.

Preferably, the styrene monomer(s) is (are) present at a content below that of the methacrylic and/or methacrylate monomers, for example at a content ranging from 4 to 9 mol % relative to the number of moles of methacrylic and/or methacrylate monomers.

By way of examples of styrene monomers, mention may be made of styrene, c-methylstyrene and styrene derivatives substituted in the ortho-, meta- or para-position.

By way of examples of methacrylic and/or methacrylate monomers, mention may be made of methacrylic acid, alkyl methacrylates, cycloalkyl methacrylates, alkenyl methacrylates or aryl methacrylates, such as methyl methacrylate, lauryl methacrylate, cyclohexyl methacrylate, allyl methacrylate or phenyl methacrylate, hydroxyalkyl methacrylates such as 2-hydroxyethyl methacrylate or 2-hydroxypropyl methacrylate, ether alkyl methacrylates such as 2-ethoxyethyl methacrylate, alkoxy- or aryloxy-polyalkylene glycol methacrylates, such as methoxy-polyethylene glycol methacrylates, ethoxypolyethylene glycol methacrylates, methoxypolypropylene glycol methacrylates, methoxypolyethylene glycol-polypropylene glycol methacrylates or mixtures thereof, aminoalkyl methacrylates, such as 2-(dimethylamino)ethyl methacrylate (MADAME), methacrylates of amine salts, such as [2-(methacryloyloxy)ethyl]trimethylammonium chloride or sulfate or [2-(meth-acryloyloxy)ethyl] dimethylbenzylammonium chloride or sulfate, fluoromethacrylates, such as 2,2,2-tri-fluoroethyl methacrylate, silylated methacrylates such as 3-methacryloylpropyltrimethylsilane, phosphorus-comprising methacrylates such as alkylene glycol phosphate methacrylates, hydroxyethylimidazolidone methacrylate, hydroxyethylimidazolidinone methacrylate or 2-(2-oxo-1-imidazolidinyl)ethyl methacrylate.

By way of example of a monofunctional alkoxyamine that may be used, mention may be made of that corresponding to the formula below:

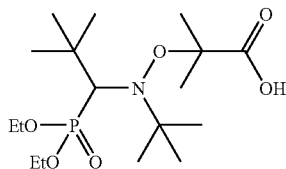

The polyfunctional alkoxyamines of formula (III) are generally derived from a method consisting in reacting one or more alkoxyamines of formula (I) below:

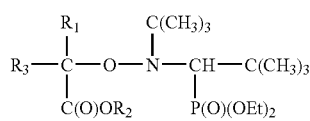 (I)

in which $R_1$, $R_2$ and $R_3$ are as defined above, with at least one polyunsaturated compound of formula (II):

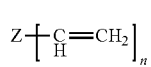 (II)

in which Z represents an aryl group or a group of formula $Z_1$—[X—C(O)]$_n$, in which $Z_1$ represents a poly-functional structure originating, for example, from a compound of the polyol type, X is an oxygen atom, a nitrogen atom bearing a carbonaceous group or a hydrogen atom, or a sulfur atom, and n is an integer greater than or equal to 2,
in the presence or absence of solvent(s), preferably chosen from alcohols such as ethanol, aromatic solvents, chlorinated solvents, ethers and aprotic polar solvents,
at a temperature ranging, in general, from 0 to 90° C., preferably from 25 to 80° C.,
the molar ratio between monofunctional alkoxyamine(s) of formula (I) and polyunsaturated compound(s) of formula (II) ranging from 1.5 to 1.5 n, preferably from n to 1.25 n.

By way of examples of polyunsaturated compounds that may be used to prepare polyfunctional alkoxyamines as defined above, mention may be made of polyfunctional vinylbenzenes (Z then being an aryl group) or polyfunctional acrylic derivatives (Z then being a group of formula $Z_1$—[X—C(O)]$_n$). Preferably, the poly-unsaturated compound is divinylbenzene, trivinyl-benzene, ethylene glycol diacrylate, 1,3-butanediol diacrylate, 1,4-butanediol diacrylate, 1,6-hexanediol diacrylate, neopentyl glycol diacrylate, cyclohexane dimethanol diacrylate, diethylene glycol diacrylate, triethylene glycol diacrylate, tetraethylene glycol diacrylate, dipropylene glycol diacrylate, tripropylene glycol diacrylate, polyethylene glycol diacrylates (sold by Sartomer under the names SR259, SR344, SR610), alkoxylated hexanediol diacrylates (sold by Sartomer under the names CD561, CD564, CD560), bisphenol-A diacrylate, ethoxylated bisphenol-A diacrylates (sold by Sartomer under the names SR349, SR601, SR602, CD9038), trimethylolpropane triacrylate, pentaerythrityl triacrylate, tris(2-hydroxyethyl)-isocyanurate triacrylate, ethoxylated trimethylol-propane triacrylates (sold by Sartomer under the names SR454, SR499, SR502, SR9035, SR415), propoxylated glyceryl triacrylate (sold by Sartomer under the name SR9020), propoxylated trimethylolpropane triacrylates (sold by Sartomer under the names SR492 and CD501), pentaerythrityl tetraacrylate, di-trimethylolpropane tetraacrylate, ethoxylated pentaerythrityl tetra-acrylate (sold by Sartomer under the name SR494), dipentaerythrityl pentaacrylate, caprolactone modified dipentaerythrityl hexaacrylates (sold by Sartomer under the names Kayarad DCPA20 and DCPA60) or dipentaerythrityl polyacrylate (sold by UCB Chemicals under the name DPHPA).

When Z corresponds to the formula $Z_1$—[X—C(O)]$_n$, the polyfunctional alkoxyamines correspond to formula (IIIa) below:

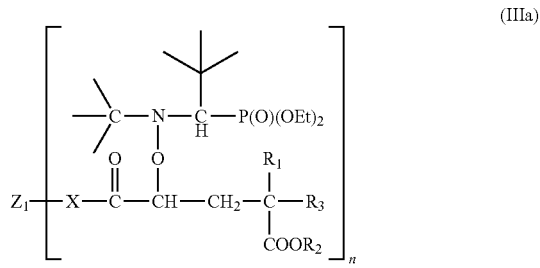 (IIIa)

$Z_1$ generally corresponding to an alkylene group.

A specific example of a polyfunctional alkoxyamine in accordance with the general definition given above is the polyfunctional alkoxyamine corresponding to the formula below:

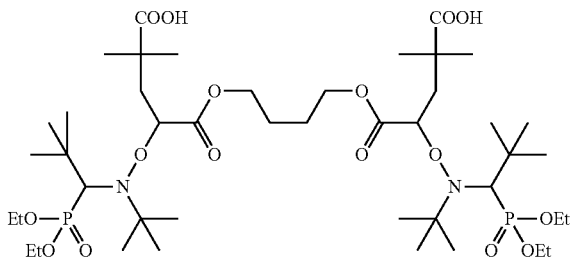

this polyfunctional alkoxyamine being derived from the reaction of a monofunctional alkoxyamine of formula (I) with 1,4-butanediol diacrylate.

Without the applicant being held to any explanation, it thinks that, when the polymerization takes place in an emulsion, the monofunctional alkoxyamines of formula (I) and/or the polyfunctional alkoxyamines of formula (III) play both the role of an initiating agent (and control agent) and the role of an emulsifier; thus, the surfactant properties of the water-soluble monofunctional alkoxyamines of formula (I) and/or poly-functional alkoxyamines of formula (III) make it possible to moderate, or even avoid, the use of other surfactants.

In particular, the monofunctional alkoxyamines of formula (I) and/or the polyfunctional alkoxyamines of formula (III) are water-soluble when $R_2$ is an alkali metal such as Li, Na or K or an ammonium ion such as $NH_4^+$ or $NHBu_3^+$, Bu representing a butyl group.

For the purpose of the present invention, the term "water-soluble monofunctional alkoxyamine" or "water-soluble polyfunctional alkoxyamine" is intended to mean any monofunctional alkoxyamine of formula (I) or poly-functional alkoxyamine of formula (III) whose solubility in the water or (water/water-miscible compound) phase is at least 1 g/l at 25° C.

The monofunctional alkoxyamine or polyfunctional alkoxyamine may be introduced into the polymerization medium at a rate of 0.01% to 10%, preferably 0.1% to 5% by weight, relative to the weight of monomer(s).

The method for preparing the living polymer according to the invention may be carried out by the solvent process, in bulk, or in dispersed media (such as emulsion, suspension). The emulsion may be a miniemulsion or a microemulsion.

When the polymerization is carried out by emulsion polymerization, it is possible to add to the polymerization medium at least one emulsifier, i.e. a surfactant for stabilizing the emulsion, it being understood that said emulsifier is not an alkoxyamine as defined above. Any emulsifier that is customary in this type of emulsion may be used.

The emulsifier may be anionic, cationic or nonionic. The emulsifier may be an amphoteric or quaternary or fluorinated surfactant. It may be chosen from alkyl sulfates, aryl sulfates, alkyl sulfonates, aryl sulfonates, fatty acid salts, polyvinyl alcohols and polyethoxylated fatty alcohols. By way of example, the emulsifier may be chosen from the following list:
  sodium lauryl sulfate,
  sodium dodecylbenzenesulfonate,
  sodium stearate,
  polyethoxylated nonylphenol,
  sodium dihexyl sulfosuccinate,
  sodium dioctyl sulfosuccinate,
  lauryldimethylammonium bromide,
  laurylamidobetaine,
  potassium perfluorooctylacetate.

The emulsifier may also be an amphiphilic block or random or grafted copolymer, such as sodium styrene sulfonate copolymers, and in particular polystyrene-b-poly(sodium styrene sulfonate) or any amphiphilic copolymer prepared by any other polymerization technique.

The emulsifier may be introduced into the polymerization medium at a rate of 0.1% to 10% by weight, relative to the weight of monomer(s).

A living polymer that may be obtained by the method of the invention is a poly(methyl methacrylate) comprising styrene units at a content ranging from 4 to 9 mol % relative to the number of moles of methyl methacrylate units.

The method of the invention is a controlled and living radical method, insofar as it has been noted that:
  the number-average molecular mass (Mn) as a function of the conversion of monomers to polymers changes in a linear manner and that the Neperian logarithm of the ratio ($M_0/M$) ($M_0$ representing the initial concentration of monomer(s) and M representing the concentration of monomers at a given moment of polymerization) changes in a linear manner as a function of time;
  it is possible to reinitiate all the polymer chains obtained by this method by adding a monomer, in order to produce a block grafted to the living polymer obtained.

Furthermore, the method has the particularity of making it possible to obtain an excellent degree of conversion of the methacrylic and/or methacrylate monomers, said degree of conversion being about 90%, whereas, in the prior art, it was in the region of 50% in the absence of styrene monomers.

By virtue of the method of the invention, it is thus possible to prepare very high-molecular-weight polymers having a polydispersity index of less than 2.

Thus, according to a second subject, the invention relates to a living polymer comprising methacrylic and/or methacrylate units derived from the polymerization of one or more methacrylic and/or methacrylate monomers, that can be obtained by means of a method as defined above.

The method of the invention mentioned above therefore applies quite naturally to the preparation of block copolymers.

Thus, according to a third subject, the invention relates to a method for preparing a block copolymer comprising at least one block comprising methacrylic and/or methacrylate units derived from the polymerization of methacrylic and/or methacrylate monomers, referred to as B block, in which said B block(s) is (are) prepared by carrying out the method for preparing the living polymer as defined above, the living polymer thus being integrated into a copolymer in the form of a block.

Due to the living nature of this block, it is thus possible to obtain a very large number of block-copolymer architectures, depending on the order in which the monomers making up each of the blocks are introduced and the nature of the initiator and control agent used (according to whether it is a monofunctional alkoxyamine or a polyfunctional alkoxyamine).

In the subsequent disclosure, we will consider that:
  B represents a block resulting from the polymerization of methacrylic and/or methacrylate monomer(s) and of styrene monomer(s) (B corresponding to the living polymer obtained according to the method described above);
  A and C represent blocks resulting from the polymerization of monomers other than those of the B block, it being possible for these monomers to be acrylic, acrylate, methacrylic or methacrylate monomers optionally bearing acid, anhydride, hydroxyl, amine, poly(ethylene glycol), poly(ethylene oxide) or styrene groups, and mixtures thereof.

Thus, in accordance with the invention, it is possible to obtain copolymers comprising at least one B block and at least one A block, linked to one another by a covalent bond, by means of a method comprising successively:

a) a step of bringing the monomers constituting the B block into contact with a monofunctional alkoxyamine or polyfunctional alkoxyamine as defined above for a sufficient period of time until the polymerization reaction is complete;

b) a step of adding the monomers constituting the A block.

A step of eliminating the residual monomers that have not reacted during step a) may be provided for between steps a) and b).

Due to the living nature of the B block, the addition of the monomers constituting the A block generates a polymerization of these monomers from one or the two ends or more of the B block, according to whether the initiator used is a monofunctional alkoxyamine or a polyfunctional alkoxyamine.

At the end of steps a) and b), the copolymer obtained comprises:
  a series B-A, if the initiator used is a monofunctional alkoxyamine; or
  a series B-(A)$_n$, if the initiator is a polyfunctional alkoxyamine, n corresponding to the same definition as that given above.

For example, if n=2, the copolymer obtained comprises a series A-B-A.

For example, if n=3, the copolymer obtained comprises a series:

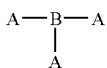

It is thus possible to obtain star and hyperbranched copolymers.

By way of example, A may be a block resulting from the polymerization of an alkyl methacrylate or alkyl methacrylic monomer and of another monomer chosen from acrylate monomers, styrene monomers, acrylate and methacrylate monomers optionally bearing acid, anhydride, hydroxyl, amine, poly(ethylene glycol) or poly(ethylene oxide) groups, or styrene monomers, and mixtures thereof.

In accordance with the invention, it is also possible to obtain copolymers comprising at least one A block and at least one B block, linked to one another by a covalent bond, by means of a method comprising successively:

a) a step of bringing the monomers constituting the A block into contact with a monofunctional alkoxyamine or polyfunctional alkoxyamine as defined above for a sufficient period of time until the polymerization reaction is complete;

b) a step of adding the monomers constituting the B block.

A step of eliminating the residual monomers that have not reacted during step a) may be provided for between steps a) and b).

At the end of steps a) and b), the copolymer obtained comprises:
  a series A-B, if the initiator used is a monofunctional alkoxyamine; or
  a series A-(B)$_n$, if the initiator is a polyfunctional alkoxyamine, n corresponding to the same definition as given above.

For example, if n=2, the copolymer obtained comprises a series B-A-B. An example of a B-A-B copolymer is a (methyl methacrylate, styrene/n-butyl acrylate/methyl methacrylate, styrene) copolymer obtained by means of a method as defined above, in which:
  the monomers constituting the B block are a mixture of methyl methacrylate and styrene, the styrene being present at a content ranging from 4 to 9 mol % relative to the number of moles of methyl methacrylate;
  the monomers constituting the A block are n-butyl acrylate;
  the alkoxyamine used in the method is a poly-functional alkoxyamine corresponding to the formula below:

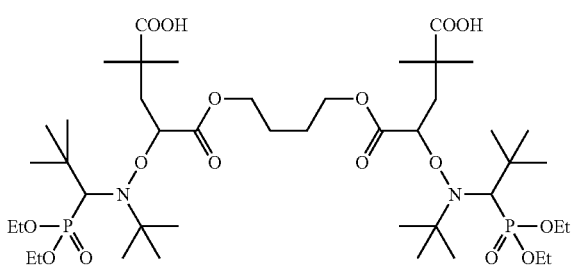

For example, if n=3, the copolymer obtained comprises a series:

Due to the living nature of the B block by virtue of the method of the invention, it is possible to envision adding, at the end of step b), another monomer in order to constitute a copolymer comprising a triblock series A-B-C. Examples of triblock copolymers may be copolymers in which:
  A is an acrylate or acrylic block;
  B is a methacrylate and/or methacrylic and styrene block in accordance with the invention;
  C is a block derived from the polymerization of all types of vinyl monomers.

Such A-B-C copolymers may play the role of a compatibilizing agent for matrices of different nature, by virtue of the presence of external blocks (A and C) of different chemical nature, while at the same time playing the role of an impact additive if the central B block has an elastomeric nature.

As mentioned above, the method for preparing block copolymers of the invention makes it possible to obtain copolymers:
  comprising blocks with a living nature, in particular blocks based on methacrylic and/or methacrylate units, which could not be envisioned in the prior art methods; and
  having a polydispersity index of less than 2, which makes it possible to obtain products with improved rheology that may be intended for applications such as lubricants, rheology modifiers for varnishes, paints, dispersants;
  having higher molecular weights than the copolymers obtained with the prior art methods, due to a degree of conversion of about 90% for the monomers constituting the B block (methacrylic and/or methacrylate monomers and styrene monomers), which makes it possible to make these copolymers advantageous as additives for thermoplastics, such as polyvinyl chloride, in particular for the transformation thereof.

Thus, according to a fourth subject, the invention relates to block copolymers that can be obtained by means of a method as defined above.

These copolymers and also the living polymers defined above may be incorporated into the constitution of numerous compositions such as:
- cosmetic compositions comprising, in addition to said living polymers and/or copolymers, a physiologically acceptable medium;
- adhesive compositions, said compositions possibly also comprising additives such as tackifying resins and plasticizers such as oils, in which case it will make a hot-melt pressure-sensitive adhesive composition (known by the abbreviation HMPSA);
- thermoplastic compositions, which may also comprise one or more thermoplastic polymers, such as poly(methyl methacrylate), polystyrene and polyvinyl chloride;
- paint compositions.

The invention will now be described by means of the examples below, given by way of nonlimiting illustration.

DETAILED DESCRIPTION OF SPECIFIC EMBODIMENTS

Example 1

This example 1 illustrates the preparation of a difunctional alkoxyamine used as initiator and control agent for carrying out the method of the invention.

The preparation of the difunctional alkoxyamine is carried out in two steps:
- the synthesis of a monofunctional alkoxyamine: 2-methyl-2-[N-tert-butyl-N-(1-diethoxyphosphoryl-2,2-dimethylpropyl)aminoxy]propionic acid corresponding to the formula below (step a):

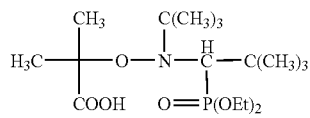

the reaction of the monofunctional alkoxyamine with 1,4-butanediol diacrylate (step b) serves to obtain the difunctional alkoxyamine of formula below:

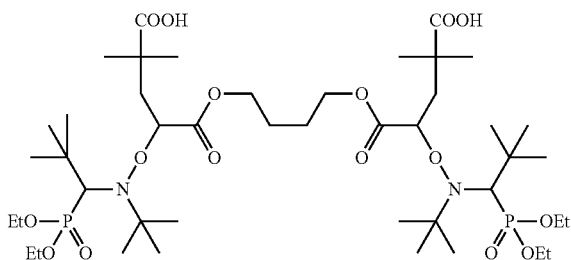

1) Step a 500 ml of degassed toluene, 35.9 g of CuBr (250 mmol), 15.9 g of powdered copper (250 mmol) and 86.7 g of N,N,N',N',N''-pentamethyldiethylenetriamine—PMDETA—(500 mmol) are introduced into a 2-liter glass reactor flushed with nitrogen, and then, with stirring and at ambient temperature (20° C.), a mixture containing 500 ml of degassed toluene, 42.1 g of 2-bromo-2-methyl-propionic aid (250 mmol) and 78.9 g of nitroxide of formula:

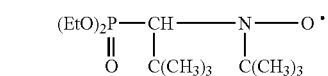

at 84%, i.e. 225 mmol, are introduced.

The mixture is left to react for 90 min at ambient temperature with stirring, and then the reaction medium is filtered. The toluenic filtrate is washed twice with 1.5 liters of a saturated aqueous solution of $NH_4Cl$.

A yellowish solid is obtained, which is washed with pentane so as to give 51 g of 2-methyl-2-[N-tert-butyl-N-(diethoxyphosphoryl-2,2-dimethylpropyl)aminoxy]-propionic acid (yield 60%).

The analytical results are given below:
- molar mass determined by mass spectrometry: 381.44/ $g \cdot mol^{-1}$ (for $C_{17}H_{36}NO_6P$)
- elemental analysis (empirical formula: $C_{17}H_{36}NO_6P$)
  - % calculated: C=53.53, H=9.51, N=3.67.
  - % found: C=53.57, H=9.28, N=3.77.
- melting carried out on a Büchi B-540 apparatus: 124° C./125° C.

2) Step b

The following are introduced into a 100-ml round-bottomed flask flushed with nitrogen:
- 2 g of alkoxyamine prepared in step a (2.1 equivalents);
- 0.55 g of 1,4-butanediol diacrylate sold by Aldrich, purity of 90% (1 equivalent);
- 5.7 ml of ethanol.

The mixture is refluxed (temperature 78° C.) for 20 hours and then the ethanol is evaporated under vacuum. 2.5 of a highly viscous yellow oil are obtained.

The $^{31}P$ NMR analysis shows a complete disappearance of the monofunctional alkoxyamine prepared in step a (27.4 ppm) and the appearance of the dialkoxyamine (multiplet at 24.7-25.1 ppm).

The electrospray mass spectrometry analysis shows the mass 961 (M+).

Example 2

This example illustrates a poly(n-butyl acrylate) polymer intended to constitute one of the blocks of a copolymer prepared in accordance with the method of the invention.

To do this, the following are introduced into a polymerization reactor equipped with a variable-speed stirring motor, inlets for introducing reactants, bleed lines for introducing inert gases to drive off the oxygen, probes for measuring the temperature, a system for condensing vapors with reflux, and a jacket for heating/cooling the content of the reactor by circulating in said jacket a heat-transfer fluid:
- 320 g of n-butyl acrylate (i.e. 2.5 mol); and
- 8.8 g of polyfunctional alkoxyamine prepared according to the example mentioned above (i.e. 9.1 mmol).

After several degassings with nitrogen, the reaction medium is brought to 115° C. and this temperature is maintained by thermal regulation for several hours. Samples are taken throughout the reaction in order to:
- determine the polymerization kinetics by gravimetry (measurement of solids content);
- monitor the change in number-average molecular mass (Mn) as a function of the conversion of monomer to polymer.

When 80% conversion is reached, the reaction medium is cooled to 60° C. and the residual n-butyl acrylate is eliminated by evaporation under vacuum.

The molecular masses of the poly(n-butyl acrylate) in polystyrene equivalent, determined by size exclusion chromatography, are 29 690 g/mol for the mass at the distribution peak (Mp), 23 300 g/mol for the number-average molecular mass (Mn) and 29 780 g/mol for the weight-average molecular mass (Mw). The polydispersity index is 1.3.

Example 3

This example illustrates the reinitiation of the poly(n-butyl acrylate) prepared in Example 2 with methyl methacrylate.

391 g of methyl methacrylate (3.9 mol) and 156 g of toluene are added, at 60° C., to the difunctional poly(n-butyl acrylate) prepared according to Example 2. The reaction medium is then heated at 95° C. for 2 hours. The conversion reached is about 50%. After a return to ambient temperature, the solution of (methyl methacrylate-b-n-butyl acrylate-b-methyl methacrylate) copolymer is drawn off from the reactor and the residual monomers and solvents are eliminated by evaporation under vacuum.

The molecular masses of the (methyl methacrylate-b-n-butyl acrylate-b-methyl methacrylate) copolymer in poly(methyl methacrylate) equivalent, determined by size exclusion chromatography (known under the abbreviation SEC), are 98 910 g/mol for the mass at the distribution peak (Mp), 62 110 g/mol for the number-average molecular mass (Mn) and 124 500 g/mol for the weight-average molecular mass (Mw). The polydispersity index is 2.0. The poly(methyl methacrylate) end blocks are now living in nature. It is not therefore possible to reinitiate these blocks in order to synthesize subsequent blocks.

Example 4

This example illustrates the reinitiation of the poly(n-butyl acrylate) prepared in Example 2 in order to synthesize end blocks based on methyl methacrylate, which end blocks are prepared in accordance with the principles of the present invention.

391 g of methyl methacrylate (3.7 mol), 17.7 g of styrene (0.17 mol) and 156 g of toluene are added, at 60° C., to the difunctional poly(n-butyl acrylate) prepared according to Example 2. The reaction medium is then heated to 95° C. After 150 minutes, the conversion reaches approximately 90%. After a return to ambient temperature, the solution of (methyl methacrylate, styrene-b-n-butyl acrylate-b-methyl methacrylate, styrene) copolymer is drawn off from the reactor and the residual monomers and solvents are eliminated by evaporation under vacuum.

The molecular masses of the (methyl methacrylate, styrene-n-butyl acrylate-methyl methacrylate, styrene) copolymer in poly(methyl methacrylate) equivalent, determined by size exclusion chromatography, are 92 300 g/mol for the number-average molecular mass (Mn) and 129 220 g/mol for the weight-average molecular mass (Mw). The polydispersity index is 1.4.

Example 5

This example illustrates the reinitiation of the poly(n-butyl acrylate) prepared in Example 2 in order to synthesize end blocks based on methyl methacrylate, which end blocks are prepared in accordance with the principles of the present invention.

391 g of methyl methacrylate (3.7 mol), 17.7 g of styrene (0.17 mol) and 156 g of toluene are added, at 60° C., to the difunctional poly(n-butyl acrylate) prepared according to Example 2. The reaction medium is then heated to 95° C. After 150 minutes, the conversion reaches approximately 90%. After a return to ambient temperature, the solution of (methyl methacrylate, styrene-b-n-butyl acrylate-b-methyl methacrylate, styrene) copolymer is drawn off from the reactor and the residual monomers and solvents are eliminated by evaporation under vacuum.

The molecular masses of the (methyl methacrylate, styrene-n-butyl acrylate-methyl methacrylate, styrene) copolymer in poly(methyl methacrylate) equivalent, determined by size exclusion chromatography, are 92 300 g/mol for the number-average molecular mass (Mn) and 129 220 g/mol for the weight-average molecular mass (Mw). The polydispersity index is 1.4.

Example 6

This example illustrates the reinitiation of the poly(n-butyl acrylate) prepared in Example 1 in order to synthesize end blocks based on methacrylic acid, which end blocks are prepared in accordance with the present invention.

318 g of methacrylic acid (3.7 mol), 17.7 g of styrene (0.17 mol) and 1340 g of 1,4-dioxane are added, at 60° C., to the difunctional poly(n-butyl acrylate) prepared according to Example 1. The reaction medium is then heated to 90° C. After 100 minutes, the conversion reaches approximately 80%. After a return to ambient temperature, the solution of (methacrylic acid, styrene-b-n-butyl acrylate-b-methacrylic acid, styrene) copolymer is drawn off from the reactor and the residual monomers and solvents are eliminated by evaporation under vacuum.

The invention claimed is:

1. A method for preparing a living polymer comprising methacrylic and/or methacrylate units comprising polymerizing, in the presence of at least one styrene monomer, one or more methacrylic and/or methacrylate monomers using:

at least one monofuntional alkoxyamine of the formula (I):

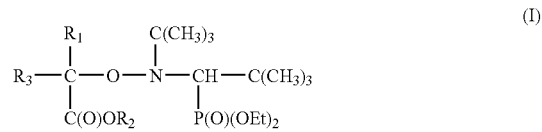

in which:

$R_1$ and $R_3$, are identical or different, represent a linear or branched alkyl group containing a number of carbon atoms ranging from 1 to 3;

$R_2$ is selected from a hydrogen atom, a linear or branched alkyl group containing a number of carbon atoms ranging from 1 to 8, a phenyl group, an alkali metal or an ammonium ion; or at least one polyfunctional alkoxyamine of formula:

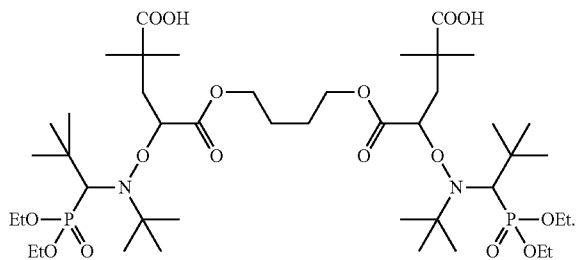

2. The method as claimed in claim 1, in which the styrene monomer is present at a content ranging from 4 to 9 mol % relative to the number of moles of methacrylic and/or methacrylate monomers.

3. The method as claimed in claim 1, in which the methacrylate monomer is chosen from a group consisting of alkyl methacrylates, cycloalkyl methacrylates, alkenyl methacrylates, aryl methacrylates, hydroxyalkyl methacrylates, ether alkyl methacrylates, alkoxy- or aryloxypolyalkylene glycol methacrylates, aminoalkyl methacrylates, methacrylates of amine salts, fluoromethacrylates, silylated methacrylates, phosphorus-containing methacrylates, hydroxyethylimidazolidone methacrylate, hydroxy-ethylimidazolidinone methacrylate and 2-(2-oxo-1-imidazolidinyl)ethyl methacrylate.

4. The method as claimed in claim 1, in which polyfunctional alkoxyamine is present at a content ranging from 0.01% to 10% by weight, relative to the total weight of monomers.

5. The method as claimed in claim 1, in which the living polymer is a poly(methyl methacrylate) comprising styrene units at a content ranging from 4 to 9 mol % relative to the number of moles of methyl methacrylate units.

6. A living polymer comprising methacrylic and/or methacrylate units derived from the polymerization of one or more methacrylic and/or methacrylate monomers, obtained by the method of claim 1.

7. A method for preparing a block copolymer comprising an A block and at least one block comprising methacrylic and/or methacrylate units derived from the polymerization of methacrylic and/or methacrylate monomers, referred to as B block, in which said B block is prepared by the method defined of claim 1.

8. The method as claimed in claim 7, in which the copolymer prepared comprises at least one B block and at least one A block, linked to one another by a covalent bond, which method comprises successively:
   a) contacting the A block with a polyfunctional alkoxyamine for a sufficient period of time until the polymerization reaction is complete; and
   b) adding the monomers constituting the B block.

9. The method as claimed in claim 8, in which the polyfunctional alkoxyamine corresponds to the formula,

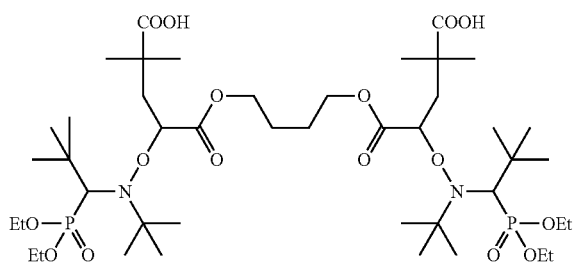

the monomers constituting the B block are a mixture of methyl methacrylate and styrene, the styrene being present at a content ranging from 4 to 9 mol % relative to the number of moles of methyl methacrylate, and the monomers constituting the A block are n-butyl acrylate.

10. A block copolymer obtained by means of the method as defined in claim 7.

11. A cosmetic composition comprising, in a physiologically acceptable medium, and at least one living polymer as defined in claim 6.

12. An adhesive composition comprising at least one living polymer as defined in claim 6.

13. A thermoplastic composition comprising at least one living polymer as defined in claim 6.

14. A paint composition comprising at least one living polymer as defined in claim 6.

* * * * *

Disclaimer 7,935,769 B2—Pierre Gerard, Denguin (FR); Stephanie Magnet, Morlanne (FR); Olivier Guerret, La Tour de Salvagny (FR); Bernadette Charleux, Vincennes (FR); Julien Nicolas, La Garenne Colombes (FR). METHOD FOR PREPARING A LIVING POLYMER COMPRISING METHACRYLIC AND/OR METHACRYLATE UNITS. Patent dated May 3, 2011. Disclaimer filed February 21, 2011, by the assignee, Arkema France.

The term of this patent shall not extend beyond the expiration date of Patent No. 7,772,340.

*(Official Gazette June 7, 2011)*